(No Model.) 2 Sheets—Sheet 1.

W. FRASIER.
LATHE ATTACHMENT.

No. 499,289. Patented June 13, 1893.

WITNESSES:
Chas. E. James
Charles W. James

INVENTOR:
Warren Frasier,
by his attorney
Geo. H. Williams (No Model.) 2 Sheets—Sheet 2.

W. FRASIER.
LATHE ATTACHMENT.

No. 499,289. Patented June 13, 1893.

WITNESSES:
Charles E. James
Charles W. James

INVENTOR:
Warren Frasier
By his attorney
Geo. H. Williams

UNITED STATES PATENT OFFICE.

WARREN FRASIER, OF LYNN, MASSACHUSETTS.

LATHE ATTACHMENT.

SPECIFICATION forming part of Letters Patent No. 499,289, dated June 13, 1893.

Application filed November 12, 1892. Serial No. 451,839. (No model.)

*To all whom it may concern:*

Be it known that I, WARREN FRASIER, a citizen of the United States, residing at the city of Lynn, in the county of Essex and State of Massachusetts, have invented a new and useful Improvement in Lathe Attachments, of which the following is a specification.

My invention consists in an attachment for lathes, whereby the tool holder may be given an oscillating motion in a plane parallel to the axial line of the lathe spindle, imparting to the cutting edge of the tool a combined longitudinal and vertical motion.

My invention is particularly adapted for turning pearl buttons, wherein it is necessary that the tool should start to cut the blank at a short distance from the center of the blank, and, as it cuts into the blank, to be moved toward the center of the same until, when finished, it stands in line with the center of the button.

Figure 1:
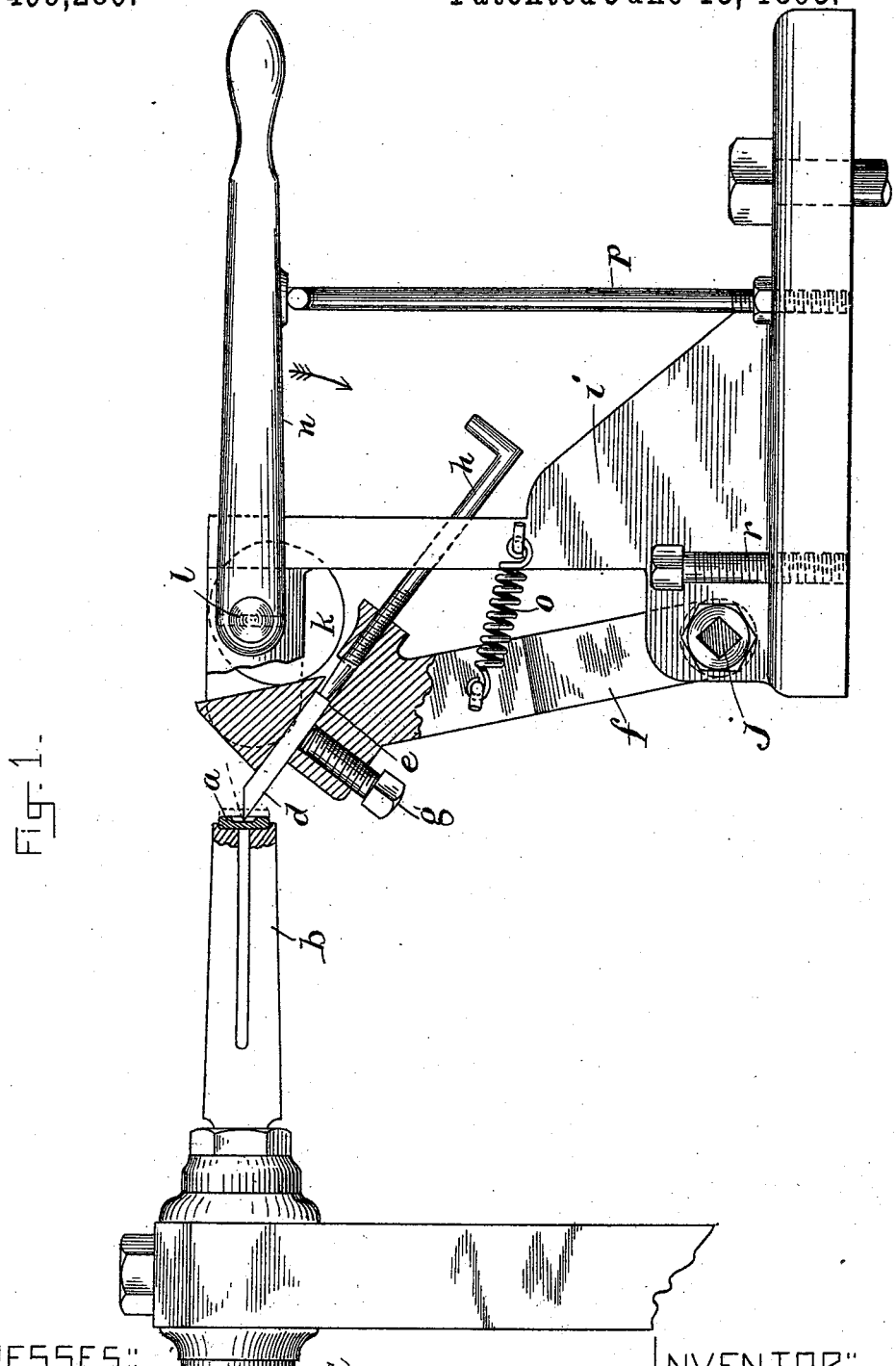
Figure 2:
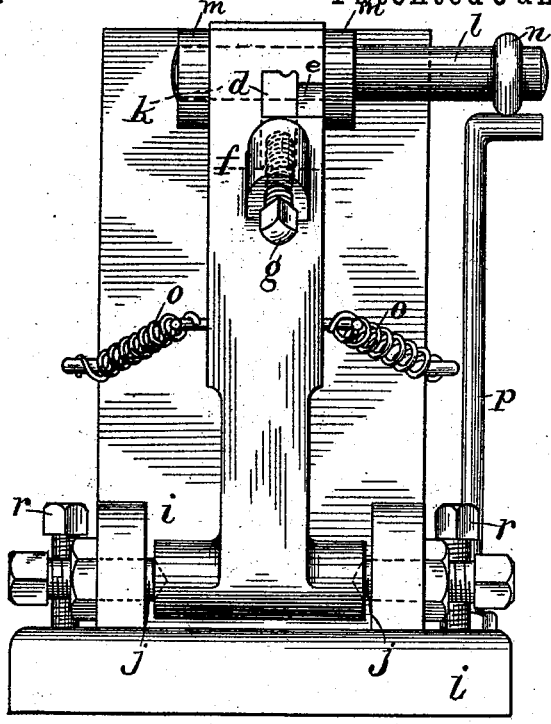
Figure 3:
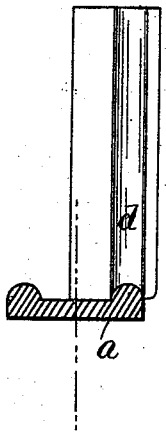
Figure 4:

In the drawings, forming part of this specification, Figure 1 is a front elevation, partly in section of my attachment, showing it in connection with the live spindle of a lathe. Fig. 2 is a side elevation of the same. Fig. 3 is a section of a button, with the cutter shown in its relative position thereto. Fig. 4 is a diagram view, illustrating a button with the relative position taken by the cutter with reference thereto.

Similar letters refer to similar parts throughout the several views.

In the drawings (Fig. 1,) the button $a$ is shown in section held by the spring jaws of the work-holder or chuck $b$. Said chuck is rotated by the live spindle $c$ of an ordinary speed lathe. The tool $d$ is held in a slot $e$ in the tool holder $f$ by the set screw $g$, and may be adjusted by the adjusting screw $h$. The tool holder $f$ is pivoted at $j, j$, to a frame $i$, said frame being bolted to the bed-plate of the lathe, or to the bench upon which the lathe rests. The tool holder is thrown forward toward the work by a cam or eccentric $k$, said cam being fastened to the shaft $l$, and having bearings at $m, m$, in the frame $i$. To the rod $l$ is fastened the hand lever $n$, by which the eccentric is turned, thus forcing the tool-holder toward the work when turned in the direction of the arrow, and when moved in the opposite direction, the springs $o, o$, draw the tool-holder away from the work. The rod $p$ forms a stop for the handle $n$, and may be adjusted up or down in the frame $i$, thus governing the extent to which the tool can be fed into the work, by limiting the motion of the handle $n$, and hence of the tool-holder $f$.

The point of the cutting edge of the tool $d$ may be raised or lowered by the adjusting screw $h$, or by the adjusting screws $r, r$; said screws being tapped into the frame $i$, and having a bearing against the bed of the lathe, it is evident that, by adjusting them, the frame $i$, and hence the tool may be raised or lowered as may be desired.

In Fig. 1, I have illustrated, by dotted lines, the thickness of the button blank before it is turned off. The cutting edge of the cutter moves on the line of the dotted circle in the same view. It will thus be seen that the cutter engages the blank at a point a short distance from the center, and ends at the center or axial line of the same. This is still further illustrated by the end view diagram, Fig. 4.

In Fig. 3, I have shown a section of the button with the cutter in its proper relation thereto; it will be seen that the cutting edge projects slightly beyond the center or axial line of the button.

Having thus described my invention, what I claim, and desire to secure by Letters Patent, is—

1. In a lathe attachment, the combination of a tool-support, adapted to be oscillated in a plane parallel to the axial line of the lathe-spindle, and a cam for moving said tool support, substantially as described for the purposes specified.

2. In a lathe attachment, the combination of the frame $i$, tool-support $f$, pivoted thereon, and adapted to be oscillated in a plane parallel to the axial line of the lathe spindle, cam $k$, shaft $l$, and lever $n$; substantially as described, for the purposes specified.

3. In a lathe attachment, the combination of the frame $i$, tool support $f$, pivoted thereon, and adapted to be oscillated in a plane parallel to the axial line of the lathe-spindle, cam $k$, shaft $l$, springs $o, o$, lever $n$, and adjustable stop $p$; substantially as described, for the purposes specified.

WARREN FRASIER.

Witnesses:
CHARLES E. JAMES,
CHARLES W. JAMES.